June 15, 1971

C. R. COPELAND 3,584,403

SELF-LOADING SCRAPER HAVING EJECTOR WHICH MOVES
REARWARDLY FOR UNLOADING
Filed Aug. 15, 1969

INVENTOR.
Charles R. Copeland
BY
E. J. Bishup
ATTORNEY

United States Patent Office 3,584,403
Patented June 15, 1971

3,584,403
SELF-LOADING SCRAPER HAVING EJECTOR
WHICH MOVES REARWARDLY FOR UNLOADING
Charles R. Copeland, Indianapolis, Ind., assignor to
General Motors Corporation, Detroit, Mich.
Filed Aug. 15, 1969, Ser. No. 850,354
Int. Cl. B60p *1/36;* E02f *3/62*
U.S. Cl. 37—8                                    4 Claims

ABSTRACT OF THE DISCLOSURE

A self-loading scraper having the front end of the bowl supporting an elevating device having a plurality of transverse flight members. The ejector is normally positioned adjacent to and slightly to the rear of the elevating device, and in addition to discharging material from the bowl, the ejector serves to cooperate with the flight members for confining and compartmentalizing material as it is being raised by the elevating device into the bowl.

---

This invention concerns a self-loading scraper and more particularly a self-loading scraper of the elevating type having a movable ejector, the front surface of which normally cooperates with the flight members of the elevating device to aid in loading the scraper bowl.

Earthmoving scrapers generally load quite easily during the initial loading stage but as the bowl becomes filled with material, the scraper tends to bog down and often requires the pushing assistance of a bulldozer to force the last few yards of material into the bowl. In order to alleviate this problem and make scrapers self-loading, many scraper manufacturers are now offering elevating devices located in the front end of the bowl. These elevating devices take the form of an endless conveyor having a plurality of transverse flight members which are driven around a pair of vertically spaced wheels for picking up material cut by the scraper blade and raising it into the scraper bowl to form a heaped load. Although elevating type scrapers have found wide acceptance with contractors, there are certain problems which are encountered with this type of scraper, particularly in those cases where the material must be discharged out of the mouth of the bowl. Under such conditions, it should be apparent that suitable support structure must be provided which will permit the elevating device to be swung out of the path of the material as it is being unloaded. A further difficulty arises with this form of scraper because the elevating device serves as a poor retaining means for preventing material from being dropped out of the front end of the bowl while it is being transported to an unloading area.

In the preferred form of the invention the above and other problems are obviated by providing an ejector for the scraper bowl which is so located therein that it serves to present its forward surface in cooperating relationship with the flight members of the elevating device to facilitate loading of material into the bowl and also serves to maintain the material therein once it has been loaded into the bowl. The usual function for the ejector, namely, discharging the material out of the bowl is retained; however, in this case the material is pushed out of a rear portion of the bowl through a selectively movable door, the lower end of which presents a striker blade for leveling the material as it is being unloaded.

More specifically, the self-loading scraper made according to this invention has the bowl portion thereof formed with a pair of laterally spaced side walls which are interconnected by a floor portion. A transverse cutting blade is carried by the scraper bowl forwardly of the floor portion and an elevating device of the conveyor type is mounted in the forward end of the bowl. The elevating device has a plurality of vertically spaced transverse flight members which rotate about suitable gear wheels and serve to pick up the material cut by the scraper blade and raise it into the bowl. The ejector extends between the side walls and has a front wall and a rear wall. The ejector is located in the forward end of the scraper with the front wall thereof lying in a plane closely adjacent and parallel to the path of travel of the flight members so as to compartmentalize the material being carried by the flight members. As a result, the material moves up along the front surface of the ejector and drops into the bowl after the flights pass the upper edge of the ejector. Hydraulic means in the form of double-acting jacks are carried by the side walls and connected to the ejector for moving the latter rearwardly to discharge the material out of the scraper bowl. Prior to movement of the ejector a tailgate located at the rear of the scraper bowl is adapted to be opened to expose an opening in the bottom of the bowl through which the material can exit.

Accordingly, the objects of the present invention are to provide a scraper bowl having an elevating device and an ejector plate located in the front end thereof in cooperating relationship for aiding the loading of material into the bowl; to provide a self-loading scraper having a scraper bowl provided with an elevating device which cooperates with the front surface of the ejector during a loading operation to positively confine and retain the cut material as it is being raised into the bowl; to provide an ejector for a self-loading scraper of the elevating type that has the dual function of cooperating with an elevating device to confine material into individual compartments as the material is being raised into the bowl and also serving to discharge the material out of the rear of the bowl; to provide an ejector for a scraper bowl that is normally located at the front end of the bowl to aid the loading thereof by an elevating device and can be translated rearwardly to discharge material through an opening at the rear of the bowl; to provide a scraper bowl which supports an elevating device having a plurality of chain-supported transverse flight members which cooperate with a rearwardly inclined front surface of an ejector to confine and raise material during a scraper loading operation; and to provide a self-loading scraper in which the ejector is normally positioned at the front end of the bowl and serves to close the mouth thereof and coacts during a digging operation with a conveyor type loading device also supported at the front end of the bowl for loading cut material into the bowl.

Other objects and advantages of the present invention will be more apparent from the following detailed description when taken with the drawings in which.

Figure 1:
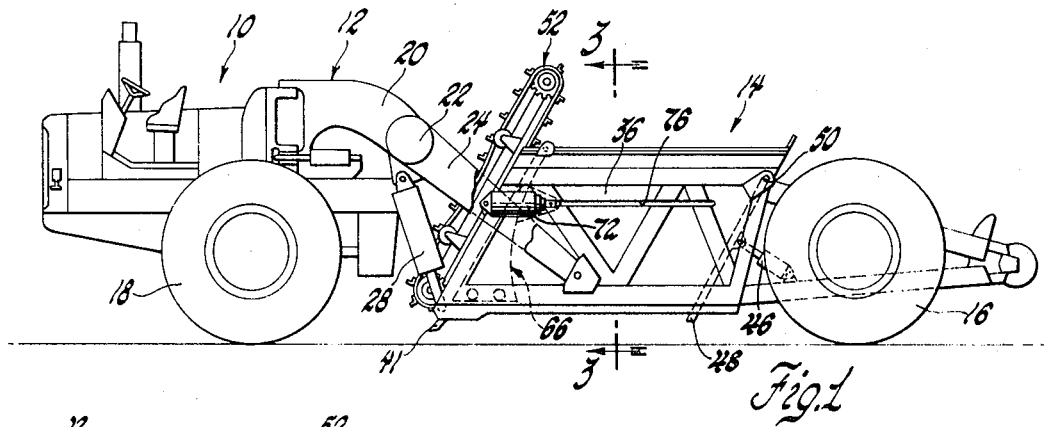
FIG. 1 is an elevation view of the self-loading scraper made according to the invention.
Figure 2:
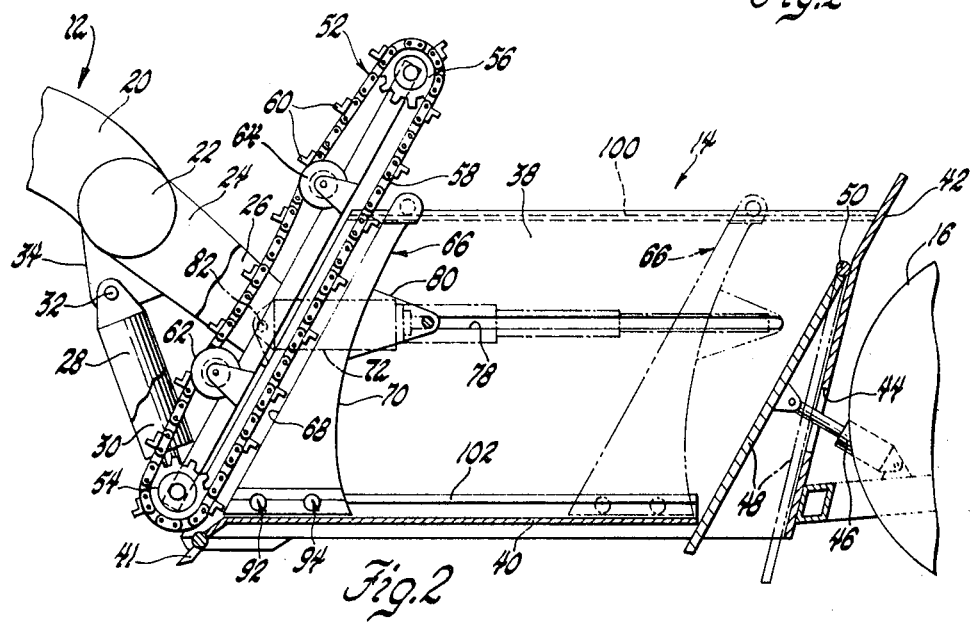
FIG. 2 is an enlarged longitudinal sectional view showing the interior of the bowl portion of the self-loading scraper of FIG. 1.

Referring to the drawings and more particularly FIGS. 1 and 2 thereof, the earthmoving self-loading scraper made in accordance with the invention generally comprises an overhung tractor 10 which is connected through a hitch arrangement 12 to a trailing bowl 14, the rear end of which is supported by a pair of laterally spaced wheels 16. As is conventional, an intermediate portion of the tractor 10 is similarly supported by a pair of laterally spaced wheels 18 and the hitch arrangement 12 includes the usual coupling providing for relative movement of the tractor 10 relative to the bowl 14 about a vertical steer axis as well as oscillatory movement about a horizontal axis so as to permit the scraper to travel over irregular ground. More specifically, the hitch arrangement 12 includes the usual gooseneck 20 which extends rearwardly for rigid connection with a transverse torque tube 22, the opposite ends of which rigidly support rearwardly extending pull arms 24 and 26 that serves to pivotally support the bowl and permit movement thereof between a lowered-dig position and a raised-carry position under the control of hydraulic bowl cylinders 28 and 30. Each of the bowl cylinders has the cylinder portion thereof connected by a pivotal connection 32 to a depending bracket 34 fixed to the underside of the associated pull arm, while the piston rod member is pivotally connected to a lower portion of the bowl 14.

Figure 3:
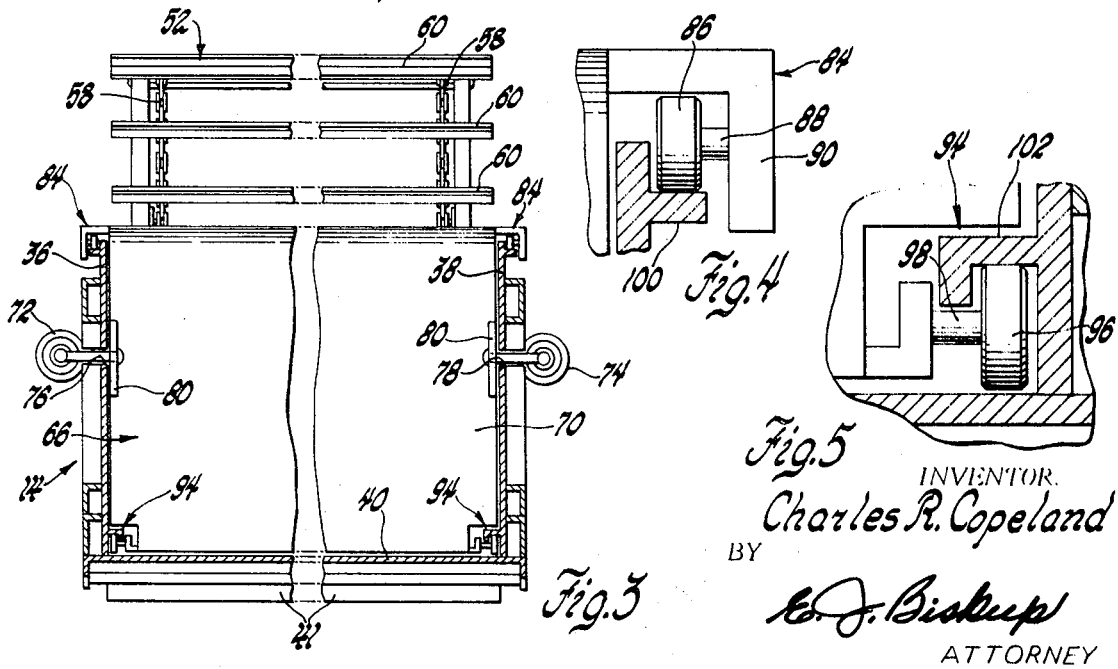
FIG. 3 is an enlarged cross-sectional view showing the ejector incorporated with the scraper and taken on line 3—3 of FIG. 1.
Figure 4:
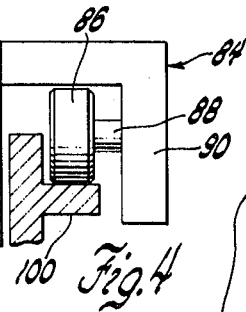
FIG. 4 is an enlarged fragmentary view of the support arrangement for the upper side portions of the ejector seen in FIG. 3.
Figure 5:
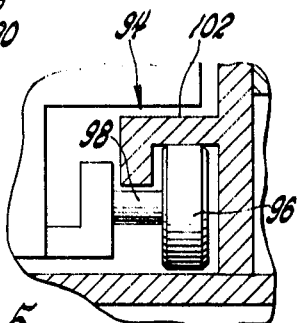
FIG. 5 is an enlarged fragmentary view of the support arrangement for the lower side portions of the ejector seen in FIG. 3.

As best seen in FIGS. 2 and 3, the bowl 14 takes the form of a box having a pair of laterally spaced side walls 36 and 38, the lower ends of which are interconnected by a transversely extending floor portion 40. A blade 41 extends transversely between the side walls 36 and 38 forwardly of the floor portion, and serves to cut material in the usual manner when the bowls is in the lowered-dig position. In addition, a back wall 42 is provided for interconnecting the rear ends of the side walls 36 and 38 and includes a centrally located opening 44 through which a hydraulic cylinder 46 extends which serves to move a door or tailgate 48 pivotally supported by the bowl side walls for movement about a transverse horizontally extending shaft 50. It will be noted that the floor portion 40 does not extend rearwardly to the back wall 42 so as to completely close the bottom of the bowl but terminates a distance from the back wall so as to leave a rectangular opening at the rear of the bowl. When viewed from the bowl interior, such opening is closed by the tailgate 48 when the latter is in the full line position as seen in FIG. 2 and is exposed when the tailgate is in the phantom line position of FIG. 2. The purpose of the tailgate 48 will become more apparent as the description proceeds.

The front end of the bowl 14 supports an elevating device 52 comprising the usual vertically spaced gear wheels 54 and 56 which have entrained thereabout an endless chain 58, the links of which support a plurality of transversely extending flight members 60. A pair of spaced idler wheels 62 and 64 are carried by the frame of the elevating device 52 and provide rolling support for the chain 58 while the latter is driven by the gear wheels. Elevating devices of this type are well known in the scraper art and are utilized for aiding the loading of material cut by the blade 41 during a digging operation.

It will be recognized by those skilled in the art that the self-loading scraper described up to this point is generally of conventional design and one which has been successfully utilized in the field for loading various forms of materials. As mentioned hereinbefore, however, the present invention contemplates facilitating the loading ability of a scraper of this form and, to this end, the bowl 14 is provided with an ejector 66 which is normally located at the forward end of the bowl 14 behind the elevating device 52. The ejector 66 extends transversely between the side walls 36 and 38 of the bowl and comprises a rearwardly inclined front wall 68 and an arcuately-shaped rear wall 70. It will be noted that the inclination of the front wall 68 is such that it parallels the path of travel of the flight members 60 of the elevating device 52. In addition, the front wall 68 is preferably spaced slightly to the rear of the flight members so minimum or no contact occurs between the two members. The front wall 68, however, should be sufficiently close to the flight members so as to form therewith spaced compartments which are generally rectangular in cross section.

In the preferred form, the outer surface of the front wall 68 should be made of a low friction-high wear type metal so that the material being carried by the flight members 60 and engaging the front face of the ejector experiences a minimum of frictional restraint as it is being raised to the top of the ejector 66 wherefrom it will drop by gravity into the bowl 14.

During the unloading cycle of scraper operation, the ejector 66 moves from the full line position shown in FIG. 2 to the phantom line position, and such translatory movement is realized by the concurrent expansion of a pair of multi-stage, double-acting ejector cylinders 72 and 74 respectively carried by the side walls 36 and 38 of the bowl 14. It will be noted that elongated horizontal slots 76 and 78 are formed in the side walls 36 and 38 and provide a means through which the piston rod end of each of the ejector cylinders can be connected to a rearwardly projecting arm 80 rigid with the rear wall 70 of the ejector 66. The cylinder end of each ejector cylinder 72 and 74 is pivotally connected to the associated side wall of the bowl through a pivotal connection 82.

In order to facilitate movement of the ejector 66, the upper end at each side thereof carries a roller assembly 84 comprising a roller 86 which is rotatably mounted on a pin 88 attached to a shielding member 90 rigid with the ejector 66. Similarly, the lower end of the ejector 66 at each side thereof is formed with a pair of axially spaced roller assemblies 92 and 94, each comprising a similar roller 96 rotatably carried by a pin 98 which in turn is rigid with the ejector 66. The upper and lower roller assemblies are adapted to ride along horizontal tracks 100 and 102, respectively, each of which is rigidly formed with the associated side wall of the scraper bowl.

During operation of the scraper described above, the bowl 14 is initially lowered into a digging position by expanding the bowl cylinders 28 and 30. At the same time, the elevating device 52 is activated causing the flight members 60 to rotate about the spaced gear wheels 54 and 56 in a counterclockwise direction and pick up the material being cut by the scraper blade 41. In this regard, it will be noted that as each flight member 60 moves toward the scraper blade 41, it takes some of the cut material and moves it into the space between the lower end of the elevating device 52 and the ejector 66. As the flight member 60 continues to move upwardly, it cooperates with the front wall 68 of the ejector 66 to compartmentalize the material and move it therealong until the material reaches the top of the ejector whereafter it drops by gravity into the bowl 14 as mentioned before. When the bowl 14 is completely loaded with material, the bowl cylinders 28 and 30 are contracted causing the bowl 14 to raise to the position shown on FIGS. 1 and 2 and the material thereafter is transported to a fill area. To discharge the load out of the bowl 14, the hydraulic cylinder 46 is contracted causing the tailgate 48 to move to the phantom line position so as to expose the opening in the bottom of the bowl 14. At this time, some of the material will drop by gravity from the bowl and as the scraper is being moved, the lower end of the tailgate assembly serves as a striker blade for leveling purposes. In order to empty the bowl 14 completely, the ejector 66 is moved rearwardly by the ejector cylinders 72 and 74 thereby causing the remainder of the load to be discharged.

As should be apparent, the basic invention here resides in the use of the ejector for the dual function of positively confining material being raised by the elevating device and also for ejecting material out of the bowl. The form of opening provided in the rear portion of the bowl which, in this instance, consists of the tailgate and the gap provided in the floor portion, is for illustrative purposes only, and it will be readily appreciated that other types of closure devices are possible to use with the invention. For example, the floor portion can be made in two or more sections, one of which can be retracted rearwardly along a horizontal plane while the ejector is being moved rearwardly. In this manner, a large opening would be provided in the bottom of the bowl during the ejection operation and possibly would provide more efficient ejection than provided by the disclosed arrangement. In addition, it is within the scope of this invention to utilize an ejector front wall having a design other than planar, the important consideration being that the configuration of the wall conform to the path of travel of the flight members. Thus, assuming the flight members may be moving in an arcuate path, the center of which is located to the rear of the ejector plate, the ejector front wall could easily be made of a convex form to conform to this path and provide the advantages described hereinbefore.

I claim:

1. A self-loading earthmoving scraper including a tractor and a trailing scraper bowl the forward end of which is provided with an elevating device having a plurality of vertically movable transverse flight members for facilitating loading of the scraper bowl, an ejector in said bowl and having a front wall and a rear wall, the front wall of the ejector being normally located adjacent the rear portion of the elevating device to close the front of the bowl and cooperating with said flight members for compartmentalizing cut material being raised by the elevating device, and means carried by the scraper bowl for moving the ejector rearwardly whereby the rear wall of the ejector serves to discharge material out of the rear end of the scraper bowl.

2. A self-loading earthmoving scraper including a tractor and a trailing scraper bowl the forward end of which is provided with an elevating device having a plurality of vertically movable transverse flight members for facilitating loading of the scraper bowl, said scraper bowl including a pair of laterally spaced side walls, a floor portion and a back wall, a door carried by the rear end of the scraper bowl and adapted to coact with said floor portion to provide an opening in the scraper bowl through which material is discharged, an ejector in said bowl and having a front wall and a rear wall, the front wall of the ejector being normally located adjacent the rear portion of the elevating device to close the front of the bowl and cooperating with said flight members for compartmentalizing cut material being raised by the elevating device, and hydraulic means carried by the side walls of the scraper bowl for translating the ejector rearwardly whereby the rear wall of the ejector serves to discharge material out of said opening in the scraper bowl.

3. A scraper bowl adapted to be drawn by a tractor and comprising a pair of laterally spaced side walls, a floor portion interconnecting said side walls, a transverse blade carried by the scraper bowl forwardly of said floor portion for cutting material while said scraper bowl is being drawn by said tractor, an elevating device mounted in the forward end of said scraper bowl and having a plurality of transverse flight members for raising material cut by said blade into said scraper bowl, an ejector extending between said side walls and having a front wall and a rear wall, said ejector being normally located at the forward end of the scraper bowl and having the front wall thereof lying in a plane closely adjacent and parallel to the path of travel of said flight members so as to cooperate with the latter to compartmentalize the material as it is being carried by the flight members into the scraper bowl, means supporting said ejector for rearward translatory movement relative to said side walls, and a pair of hydraulic cylinders carried by said side walls and connected to said ejector for moving the latter rearwardly to dischage material out of said scraper bowl.

4. A scraper bowl adapted to be drawn by a tractor and comprising a pair of laterally spaced side walls, a floor portion interconnecting said side walls and having an opening adjacent the rear of the bowl, a door supported by the bowl for closing said opening, a transverse blade carried by the scraper bowl forwardly of said floor portion for cutting material while said scraper bowl is being drawn by said tractor, an elevating device mounted in the forward end of said scraper bowl and having a plurality of transverse flight members for raising material cut by said blade into said scraper bowl, an ejector extending between said side walls and having a front wall and a rear wall, said ejector being normally located at the forward end of the scraper bowl and having the front wall thereof lying in a plane rearwardly inclined and closely adjacent to and parallel to the path of travel of said flight members so as to cooperate with the latter to compartmentalize the material as it is being carried by the flight members into the scraper bowl, roller assemblies located at the upper and lower ends of said ejector for supporting the latter for rearward translatory movement relative to said side walls, and a pair of hydraulic cylinders carried by said side walls and connected to said ejector for moving the latter rearwardly whereby said rear wall serves to discharge material out of said opening in the floor portion of the scraper bowl.

References Cited

UNITED STATES PATENTS

| | | | |
|---|---|---|---|
| 3,296,715 | 1/1967 | Jass et al. | 37—8 |
| 3,479,755 | 11/1969 | Schropp | 37—8 |

ROBERT E. PULFREY, Primary Examiner

C. D. CROWDER, Assistant Examiner

U.S. Cl. X.R.

37—128, 133